PROCESS FOR THE MANUFACTURE OF MIXTURES OF ACID ESTERS OF PHOSPHORIC ACIDS

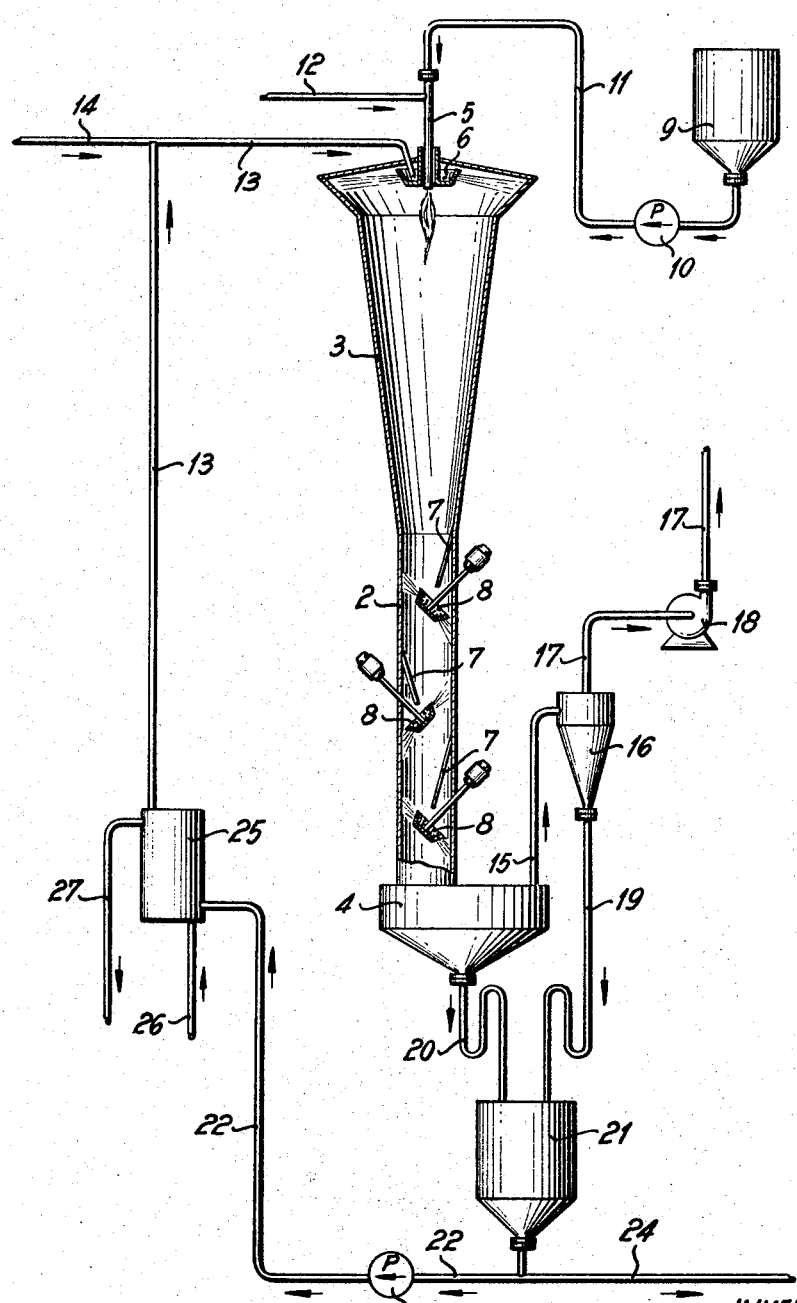

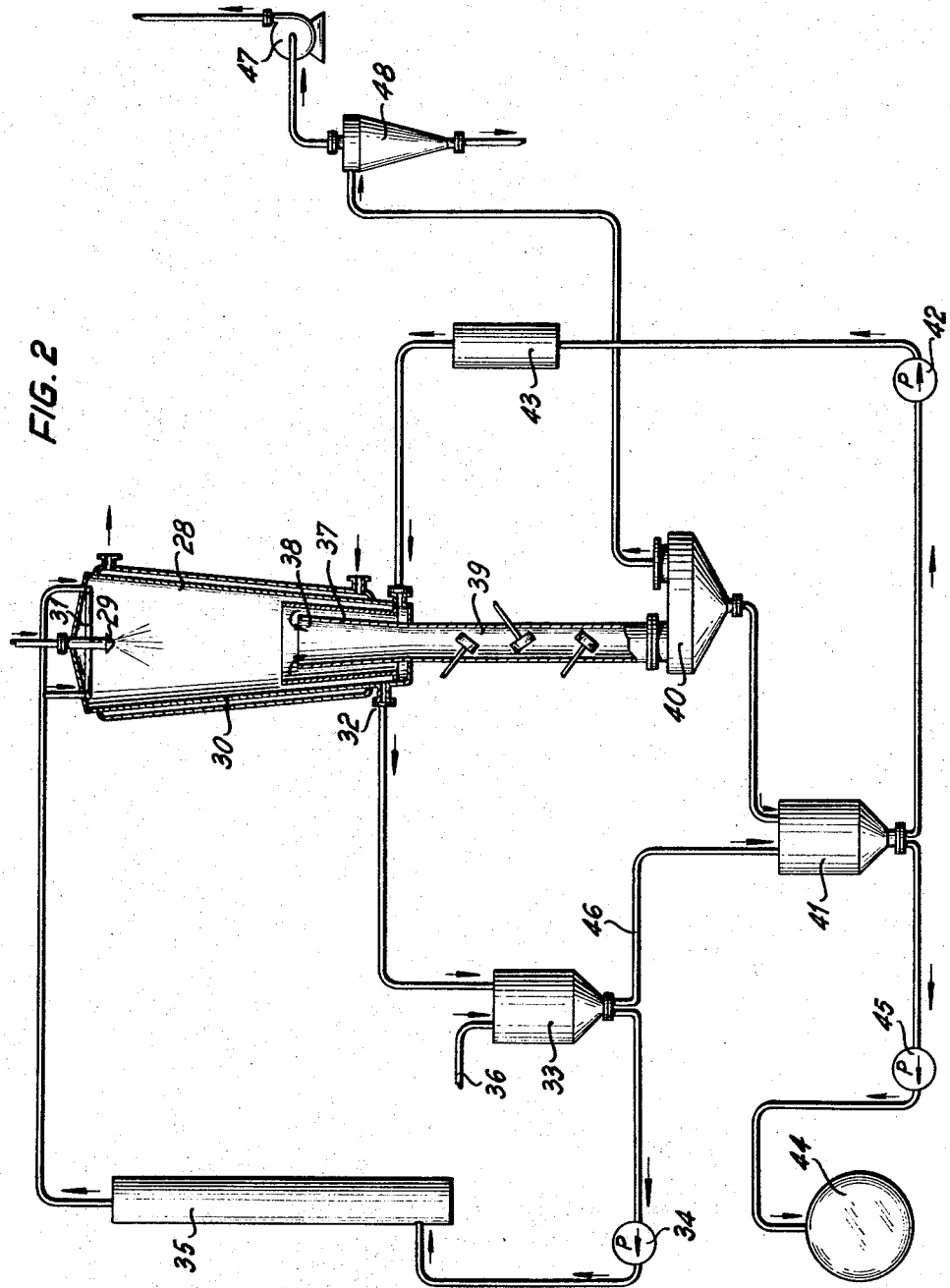

Günther Müller-Schiedmayer, Burgkirchen (Alz), Heinz Harnisch, Lovenich, near Cologne, and Joseph Cremer, Hermulheim, near Cologne, Germany, assignors to Knapsack-Griesheim Aktiengesellschaft, Knapsack, near Cologne, Germany, a corporation of Germany
Filed Oct. 1, 1963, Ser. No. 312,909
Claims priority, application Germany, Oct. 12, 1962, K 47,954
14 Claims. (Cl. 260—980)

The invention relates to a process and apparatus for the manufacture of mixtures of acid esters of orthophosphoric acid, or of acid esters of phosphoric acids condensed to a higher stage from phosphorus pentoxide and an organic hydroxy compound.

A number of special processes for making acid esters of phosphoric acids have repeatedly been described in the literature. In the standard process, phosphorus oxychloride is partially reacted with organic hydroxy compounds and the resulting chlorophosphoric acid ester is subsequently hydrolyzed.

Of greater commercial interest are those processes which are based on the reaction of an organic hydroxy compound with a defined proportion of phosphorus pentoxide. A mixture of monoalkylorthophosphate with dialkylorthophosphate can be obtained by the reaction shown in the following equation:

(1) $P_2O_5 + 3ROH \rightarrow (RO)_2P(O)OH + ROP(O)(OH)_2$ in which R represents an alkyl group.

Monoalkylorthophosphates can also be obtained by hydration of esters of higher phosphoric acids, for example, by reacting a metaphosphoric acid ester with water:

(2) $(ROPO_2)_n + nH_2O \rightarrow nROP(O)(OH)_2$

The reaction of a dehydrated phosphoric acid (polyphosphoric acid) with an alcohol results in the formation of an ester of a lower phosphoric acid associated with the disintegration of the polyphosphoric acid:

(3) $H_4P_2O_7 + ROH \rightarrow ROP(O)(OH)_2 + H_3PO_4$

In spite of the strongly dehydrating effect displayed by phosphorus pentoxide, esters of higher phosphoric acids can be prepared under carefully controlled conditions by subjecting phosphorus pentoxide to alcoholysis using an alcohol to phosphorus pentoxide ratio of smaller than 3:1 according to the following equations:

(4) $2ROH + P_2O_5 \rightarrow R_2H_2P_2O_7$ (pyro)
(5) $3ROH + 2P_2O_5 \rightarrow R_3H_3P_4O_{13}$ (tetra)

These reactions lead to products in which the ratio of alkyl groups to acid OH-groups is always 1:1, but which are not homogeneous and contain proportions of lower and higher esters as well as free polyphosphoric acids.

For reasons of economy, the commercial production of acid esters of phosphoric acids is limited to the reaction of phosphorus pentoxide, optionally in partially hydrated form, with organic hydroxy compounds. All the other conventional processes did not gain commercial interest.

The processes mentioned above are, however, associated with serious disadvantages. As the starting material, they use commercial solid phosphorus pentoxide which, due to its pronounced hygroscopicity, is difficult to handle industrially and to use in measured quantities. As compared with products, such as phosphoric acid or polyphosphoric acid, which are obtained by directly hydrating combustion gases of phosphorus pentoxide, the use of solid phosphorus pentoxide is rather uneconomic.

The reactivity and solubility of solid phosphorus pentoxide in compositions of phosphorus pentoxide with organic hydroxy compounds decrease considerably as the phosphorus pentoxide content of these compositions increases to ultimately result in lump formation and $P_2O_5$ remaining undissolved in spite of violent mixing. Unless the organic hydroxy compound is used in excess, or in the manufacture of polyphosphoric acid esters, it is very difficult to completely dissolve the amounts of phosphorous pentoxide required.

The complete dissolution of the phosphorus pentoxide can only be achieved at the expense of long reaction times or elevated temperatures which promote decomposition of the products most frequently unstable at elevated temperatures.

The present invention unexpectedly provides a process for the continuous manufacture of mixtures of acid esters of phosphoric acids in simple and economic manner from phosphorus pentoxide and an organic hydroxy compound, wherein elementary phosphorus is burned in conventional manner in a reaction zone with air and/or gases containing free oxygen and the resulting gaseous phosphorus pentoxide is absorbed in an acid ester mixture previously introduced into the reaction zone as an absorbing agent and desired to be obtained as the final product. The ester mixture should have a temperature of less than 150° C., preferably between 50 and 120° C. The ester mixture which is cycled to pass through a heat exchanging zone is subsequently admixed with an organic hydroxy compound of the type ROH, wherein R represents an organic radical which, apart from OH-groups, is free from other functional groups reacting with phosphorus pentoxide, and optionally admixed with water and/or commercial phosphoric acid to maintain the desired stoichiometric relations between the organic hydroxy compound, the phosphorus pentoxide and optionally the water in the final product continuously withdrawn from the cycle. The organic hydroxy compound ROH used is preferably an aliphatic alcohol having 1 to 18 carbon atoms, a polyhydroxy compound, for example glycol or glycerol, or a polyoxethylated compound, such as polyoxethylated phenol.

The addition of the organic hydroxy compound and, according to requirements, of water enables ester mixtures of phosphoric acids to be prepared in continuous manner, the stoichiometric composition of these mixtures being a function of the molar ratio of ROH to water on the one hand, and of the ratio of the sum total of mols (ROH+water) to the phosphorus pentoxide.

The addition of hydroxy compounds alone results in the formation of products in which the ratio of RO-groups to OH-groups is always 1:1. The molar ratio of $P_2O_5$ to ROH can be varied within the ranges of 1:3 to 1:1 in a manner corresponding to the chain length of the phosphoric acid esterified, the term "chain length" as applied to the preparation of ester mixtures of phosphoric acids condensed to a higher stage being intended to mean the chain length which theoretically results from the stoichiometric composition of the mixture.

(6) $P_2O_5 + 3ROH \rightarrow RH_2PO_4 + R_2HPO_4$
(7) $P_2O_5 + 2ROH \rightarrow R_2H_2P_2O_7$ (pyro)
(8) $P_2O_5 + ROH \rightarrow RHP_2O_6$ (meta)

The ratio of the RO-groups to the OH-groups can be shifted in favor of the OH-groups by adding water, the molar ratio of the sum of the two components to the phosphorus pentoxide being required to remain within the limits of 3:1 to 1:1. The molar ratio of $H_2O$ to ROH is not allowed to exceed a value corresponding to the equation:

(9) $n/2 P_2O_5 + n/2 H_2O + ROH \rightarrow RH_{n+1}P_nO_{3n+1}$

Depending on the chain length of the phosphoric acid, the ratio of $H_2O$ to ROH can merely be increased to that limit where 1 mol ROH is present per mol acid, that is to say where the product assumes the composition of a phosphoric acid monoester.

(10)   $P_2O_5 + ROH + H_2O \rightarrow RH_3P_2O_7$   (pyro)
(11)   $2P_2O_5 + ROH + 2H_2O \rightarrow RH_5P_4O_{13}$   (tetra)

The reaction products, wherein the molar ratio of the sum total of mols (ROH+water) to phosphorus pentoxide is 3:1, are concerned with a mixture of esters of orthophosphoric acid. The esters having a higher content of $P_2O_5$ constitute complex mixtures of phosphoric acid esters, which are derivatives of linear-condensed polyphosphoric acids, the distribution of the chain lengths in being a function of the $P_2O_5$-content corresponding to the known distribution of chain lengths of the polyphosphoric acids. The distribution of the organic groups over the phosphorus atoms is strictly statistical. The process of the present invention enables mixtures of phosphoric acid esters to be prepared which are very suitable for use, for example, for metal surface treatment or as wash-active substances (especially in salt form) or as polyphosphoric acid esters for use in organic synthesis reactions for splitting off water.

It has also been found that inasmuch as esters of low $P_2O_5$-content are concerned, for example monoesters and diesters of orthophosphoric acid, the reaction heat evolved can be dissipated in economic manner through a cooling system, and the reaction mixture maintained in the desired temperature range. With esters of polyphosphoric acid, the heat transfer to a cooling medium decreases however as their $P_2O_5$-content increases. The decrease in heat transfer with an increasing $P_2O_5$-content is simultaneously associated with an increase in the viscosity of the polyphosphoric acid ester and hence with the increasing difficulty of transporting such acid through an appropriate cooling system. The expense of cooling means becomes uneconomic when the total combustion heat of the phosphorus is required to be dissipated through a polyphosphoric acid ester.

These difficulties can be obviated in the manufacture of mixtures of acid esters of higher-condensed phosphoric acids by absorbing the gaseous $P_2O_5$ obtained by burning phosphorus in conventional manner in a reaction zone with air and/or oxygen-containing gases, the gaseous $P_2O_5$ being absorbed at temperatures below 150° C. in a mixture of acid phosphoric acid esters and the bulk of the total heat liberated during the reaction being dissipated by means of a mixture of acid phosphoric acid esters, which is cycled in a cycle I to pass through a first absorption zone and a cooling system of conventional design, with the simultaneous absorption of a portion of the $P_2O_5$ formed. By the addition of an organic hydroxy compound ROH, in which R means an organic radical which, apart from OH-groups, is free from other functional groups reacting with phosphorus pentoxide, and by the optional addition of commercial phosphoric acid and/or water, the above mixture is maintained at a molar ratio of $P_2O_5$ to (ROH+$H_2O$) of 1:3 to 1:2. Following this addition, the residual heat and $P_2O_5$ are absorbed in a mixture of higher-condensed phosphoric acids passed in a cycle II through a second absorption zone and a second cooling system. In cycle II, the molar ratio of $P_2O_5$ to (ROH+$H_2O$) is maintained within the range of 1:2 to 1:1 by adding water or commercial phosphoric acid and/or the organic hydroxy compound ROH, or preferably the acid phosphoric acid ester mixture obtained in cycle I.

The final product is continuously withdrawn from cycle II.

In this manner, at least about 75% of the reaction heat is dissipated and at least 30%, preferably between 40 to 60%, of the $P_2O_5$ produced is absorbed in cycle I.

The temperatures are preferably maintained between 80 to 120° C. in cycle I and between 90 to 100° C. in cycle II.

The organic hydroxy compound ROH is introduced into the cycled ester mixture advantageously separately from the reaction zone, the time until the introduction into the reaction zone being required to be greater than the time during which ROH reacts with the $P_2O_5$ absorbed in the ester mixture.

The organic hydroxy compound ROH is preferably an aliphatic alcohol having 1 to 18 carbon atoms, a polyhydroxy compound, such as glycol or glycerol, or a polyoxethylated compound, for example polyoxethylated phenol.

An apparatus suitable for use in the manufacture of acid esters of orthophosphoric acid is illustrated diagrammatically in FIGURE 1 of the accompanying drawings.

As shown in FIG. 1, the apparatus comprises a reaction tower, which is preferably arranged in upright position and subdivided into a combustion zone 3 disposed in the upper, funnel-shaped portion of the reaction tower and an absorption zone 2 disposed in the lower, cylindrical portion of the reaction tower, the absorption zone 2 being provided with mechanical spraying means 8 for spraying the phosphoric ester mixture trickling down the inside walls of the tower, and with deflecting plates 7 which serve to collect and convey a portion of the said mixture to the spraying means. At the lower open end of the absorption zone 2, the tower is connected to a collecting tank 4. A downwardly directed combustion nozzle 5 disposed, if desired so as to be displaceable along its vertical axis, at the upper end in the cover of the reaction tower is fed by means of pump 10 and conduit 11 with phosphorus coming from container 9 and through conduit 12 with gases containing free oxygen, the combustion nozzle being extended through the hollow shaft of a rotary atomizer which serves to atomize the cycled ester mixture on to the top portion of the inside walls of the tower. The collecting tank 4 communicates through bottom outlet pipe 20 with a reservoir 21, through a cycle conduit 22 and a circulating pump 23 with a heat exchanger 25 carrying a feed conduit 26 for supplying cooling agent and an outlet pipe 27, and through a feed conduit 13, into which the short pipe 14 for supplying the organic hydroxy compound or water or commercial phosphoric acid projects, with the rotary atomizer 6. The off-gases coming from collecting tank 4 are removed through off-gas pipes 15 and 17, a drop-separating means 16 and a blower 18, the drop-separating means communicating through line 19 with storage tank 21 from which final product is withdrawn through line 24.

An apparatus especially suitable for use in the manufacture of mixtures of acid esters of higher-condensed phosphoric acids is shown diagrammatically in FIG. 2 of the accompanying drawings.

The reaction tower is subdivided into two partially telescoped chambers 28 and 37 which slightly taper downwardly to improve sprinkling of their internal walls with absorption agent. The heat liberated on burning the phosphorus with the aid of nozzle 29 and a portion of phosphorus pentoxide formed are absorbed by the phosphoric acid ester or ester mixture sprinkled on to the wall 30 of the combustion chamber. In order to achieve uniform distribution, the absorption agent is introduced at the top portion of the tower and delivered to the walls thereof through an appropriate means, for example a spray ring 31. The phosphoric acid ester is withdrawn at 32 and cycled with the help of a pump through a reservoir 33 provided with a short outlet pipe and a connecting line 46 to cycle II. The heat is exchanged through the cooled wall of the tower and through a heat exchanger 35. The ester cycled in cycle I is maintained at a constant $P_2O_5$-concentration by introducing water or commercial phosphoric acid and/or an organic hydroxy compound through feed pipe 36.

The remaining portion of the phosphorus pentoxide in the combustion gases is absorbed in the inner funnel 37 in a phosphoric acid ester which is charged to the wall at the upper rim of the tower through an appropriate means, for example an overflow 38. The most upper rim of the inner funnel, which is directly exposed to the phosphorus flame, is covered with a material especially resistant to hot phosphoric acid, preferably with graphite.

A series-connected conventional absorption zone 39 ensures the complete absorption of the phosphorus pentoxide contained in the combustion gases. The highly concentrated acid leaves the collecting funnel at 40 and is cycled with the aid of a pump 42 from the container for the first runnings 41 to a small heat exchanger 43. The polyphosphoric acid ester produced is ultimately removed from storage tank 44 by means of acid pump 45.

The blower 47 produces a slight subpressure in the combustion zone and the gas current is caused to travel through a cyclone 48 to be freed therein from residual, entrained phosphoric acid ester.

The reaction chamber need not be made of high temperature resisting material, the inside walls being sprinkled with the phosphoric acid ester mixture, which is repumped in a cycle through an indirect cooling system and thereby maintained at temperatures below 150° C., so that overheating at the inside walls of the combustion zone cannot take place.

In the absorption zone of cycle II, a portion of the ester mixture flowing down the inside wall of the reaction chamber is withdrawn and conveyed to absorption means, for example a rotary atomizer, which finely distribute the mixture in the absorption zone in fine droplets that should be caused to flow at a high velocity as compared with the velocity of the $P_2O_5$-containing gas current.

The following examples serve to illustrate the process of the present invention.

*Example 1.—Phosphoric acid ethylester*

In the reaction tower illustrated in FIG. 1, 50 kg./hr. elementary yellow phosphorus were burned with 250–300 m.³/hr. air with the aid of a combustion nozzle. The resulting $P_2O_5$ was absorbed and the combustion heat dissipated by sprinkling the walls of the combustion tower and the absorption system connected thereto with 25 m.³/hr. cycled phosphoric acid ethylester containing 50.7% by weight $P_2O_5$.

On travelling through the tower, the phosphoric acid ethylester was heated from 82 to 97° C. The amount of heat set free was dissipated by operating the heat exchanger with 20 m.³/hr. cooling water at 18° C., the temperature of which rose to 31° C. While adding 111 kg./hr. ethanol, 225 kg./hr. phosphoric acid ethylester were produced. The yield referred to $P_2O_5$ was 99.6%.

*Example 2.—Phosphoric acid laurylester*

The process was carried out under the conditions set forth in Example 1 in such a manner that the $P_2O_5$ obtained by burning elementary, yellow phosphorus was absorbed in phosphoric acid laurylester containing 26.7% by weight $P_2O_5$ which was cycled at the rate of 30 m.³/hr. On travelling through the tower, the phosphoric acid laurylester was heated from 82 to 96° C.

While adding 300 kg./hr. molten lauryl alcohol and 14.5 kg./hr. water, 429 kg./hr. phosphoric acid laurylester were produced. The yield referred to $P_2O_5$ was 99.7%.

*Example 3.—Tetrapolyphosphoric acid methylester*

In a reaction tower as shown in FIG. 2 of the accompanying drawings, 50 kg./hr. elementary, yellow phosphorus were burned with 250–300 m.³/hr. air with the aid of combustion nozzle 29. The $P_2O_5$ formed and the combustion heat were absorbed by sprinkling the wall of the reaction tower 28 with 25 m.³/hr. cycled phosphoric acid methylester containing 67.6% $P_2O_5$ (cycle I) and by sprinkling the lower chamber 37, open at its upper end and connected to tower 39 carrying a conventional absorption means, with 20 m.³/hr. cycled polyphosphoric acid methylester containing 80.7% $P_2O_5$ (cycle II). On travelling through the tower, the phosphoric acid ester in cycle I was heated from 85 to 96° C. and the polyphosphoric acid ester in cycle II from 130 to 135° C. The heat set free was dissipated in heat exchangers 35 and 43 and through the water-cooled wall 30 of the combustion tower 28.

Heat exchanger 35 was operated with 10 m.³/hr. cooling water at 18° C., the temperature of which rose to 31° C., and heat exchanger 43 was operated with 15 m.³/hr. cooling water at 18° C., the temperature of which rose to 22° C. The tower wall 30 was cooled with 10 m.³/hr. cooling water which was heated from 18 to 26° C. While adding 14.5 kg./hr. water and 13 kg./hr. methanol, 85 kg./hr. phosphoric acid methylester containing 67.6% $P_2O_5$ were produced in acid cycle I. The ester so obtained was then introduced through acid conduit 46 into cycle II.

While adding 85 kg./hr. phosphoric acid methylester coming from cycle I, 142 kg./hr. tetrapolyphosphoric acid methylester containing 80.7% $P_2O_5$, which were removed by means of acid pump 45, were produced in cycle II. The yield referred to $P_2O_5$ was 99.7%.

What is claimed is:

1. A process for the continuous manufacture of mixtures of acid esters of phosphoric acid from phosphorus pentoxide and an organic hydroxy compound which comprises cycling an acid ester mixture of phosphoric acids through a reaction zone, an absorption zone and a heat exchanging zone, absorbing the gaseous phosphorus in the said ester mixture within the said reaction zone and absorption zone at temperatures of less than about 150° C., admixing the said ester mixture with an organic hydroxy compound ROH, said ROH being an aliphatic alcohol having 1 to 18 carbon atoms and wherein the substituents apart from OH groups are inert to phosphorus pentoxide and whereby the ROH compound is used in stoichiometric amounts referred to the phosphorus pentoxide absorbed, adjusting the ROH/$P_2O_5$-molar ratio corresponding to the molar ROH/$P_2O_5$ ratio in the final product within the range of 3:1 to 1:1, and continuously withdrawing the said final product from the cycle.

2. The process of claim 1, wherein the acid ester mixture of phosphoric acids as the absorbing agent is maintained at a temperature within the range of about 50 to 120° C.

3. The process of claim 1 wherein the ester mixture cycled is admixed in addition to the organic hydroxy compound ROH with at least one further substance selected from the group consisting of commercial phosphoric acid and water.

4. The process of claim 3, wherein the organic hydroxy compound ROH and the water are added simultaneously in proportions that the ratio of the sum total of mols (ROH+water) to mols $P_2O_5$ is within the limits of about 3:1 to 1:1 and the molar ratio of $H_2O$ to ROH assumes a value not exceeding that which corresponds to the equation:

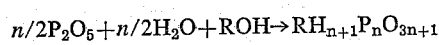

$$n/2P_2O_5 + n/2H_2O + ROH \rightarrow RH_{n+1}P_nO_{3n+1}$$

5. The process of claim 1, wherein the said organic hydroxy compound ROH is a member selected from the group consisting of glycol and glycerol.

6. A process for the continuous manufacture of mixtures of acid esters of polyphosphoric acids from phosphorus pentoxide and an organic hydroxy compound, which comprises burning elementary phosphorus in a reaction zone with a member selected from the group consisting of air and oxygen-containing gases, directly absorbing a portion of the resulting gaseous phosphorus pentoxide in a mixture of acid phosphoric acid esters at a temperature of below about 150° C., dissipating the bulk of the total reaction heat set free during the burning process by a mixture of acid phosphoric acid esters cycled in a cycle I through a first cooled absorption zone and a heat exchanging zone, absorbing concurrently therewith a portion of the phosphorus pentoxide formed in said mixture, adding to said mixture an organic hydroxy compound ROH, wherein R means an organic radical which, apart from OH-groups, is free from other functional groups reacting with phosphorus pentoxide, and thereby maintaining a molar ratio of $P_2O_5$ to ROH of about 1:3 to 1:2, then absorbing residual reaction heat and residual phosphorus pentoxide in a mixture of acid esters of higher-condensed phosphoric acids cycled in a cycle II through a second absorption zone and a second heat exchanging zone, adding the organic hydroxy compound ROH to said mixture of acid esters of higher-condensed phopshoric acid and thereby maintaining a molar ratio of $P_2O_5$ to ROH of between about 1:2 to 1:1, and continuously withdrawing final product from the said cycle II.

7. The process of claim 6, wherein the ester mixture cycled in cycles I and II is admixed in addition to the organic hydroxy compound ROH with at least one member selected from the group consisting of commercial phosphoric acid and water, the molar ratio of $P_2O_5$ to (ROH+$H_2O$) in cycle I being maintained within the range of about 1:3 to 1:2 and the molar ratio of $P_2O_5$ to (ROH+$H_2O$) in cycle II being maintained within the range of about 1:2 to 1:1.

8. The process of claim 6, wherein the acid phosphoric acid ester mixture obtained in cycle I is added to the ester mixture in cycle II.

9. The process of claim 6, wherein at least about 30% and at most about 70% of the phosphorus pentoxide formed is absorbed in the absorption zone in cycle I.

10. The process of claim 9, wherein about 40% to 60% of the phosphorus pentoxide formed is absorbed in cycle I.

11. The process of claim 6, wherein at least about 75% of the reaction heat is dissipated in cycle I.

12. The process of claim 6, wherein the temperature in cycle I is maintained at about 80 to 120° C.

13. The process of claim 6, wherein the temperature in cycle II is maintained at about 90 to 100° C.

14. The process of claim 6, wherein the organic hydroxy compound ROH is introduced separately from the reaction zone into the cycled phosphoric acid ester mixture and the time until introduction into the combustion zone is greater than the time during which ROH reacts with the phosphorus pentoxide absorbed in the ester mixture.

No references cited.

CHARLES B. PARKER, *Primary Examiner.*

JOSEPH P. BRUST, *Examiner.*

BERNARD BILLIAN, ANTON H. SUTTO,
*Assistant Examiners.*